(12) United States Patent
Hains et al.

(10) Patent No.: US 7,576,893 B2
(45) Date of Patent: Aug. 18, 2009

(54) CORRELATED SECONDARY TRC CALIBRATION METHOD

(75) Inventors: Charles M Hains, Altadena, CA (US); David E Rumph, Pasadena, CA (US); Vincent C Lung, San Gabriel, CA (US)

(73) Assignee: Xerox Corporation, Norwalk, CT (US)

( * ) Notice: Subject to any disclaimer, the term of this patent is extended or adjusted under 35 U.S.C. 154(b) by 248 days.

(21) Appl. No.: 11/841,150

(22) Filed: Aug. 20, 2007

(65) Prior Publication Data

US 2007/0285695 A1  Dec. 13, 2007

Related U.S. Application Data

(62) Division of application No. 09/569,637, filed on May 12, 2000, now Pat. No. 7,274,492.

(51) Int. Cl.
  *G06K 15/00* (2006.01)
  *G06F 15/00* (2006.01)
(52) U.S. Cl. .................. 358/3.23; 358/3.06; 358/1.9

(58) Field of Classification Search ............... 358/1.9, 358/3.06, 3.23, 3.09, 504, 3.15, 3.26; 382/254, 382/275

See application file for complete search history.

(56) References Cited

U.S. PATENT DOCUMENTS

| 5,589,954 | A | 12/1996 | Watanabe |
| 6,078,697 | A | 6/2000 | Ng |
| 7,327,898 | B2 * | 2/2008 | Fan ........................... 382/275 |

* cited by examiner

*Primary Examiner*—Thomas D Lee
(74) *Attorney, Agent, or Firm*—Fay Sharpe LLP

(57) ABSTRACT

This invention is a method of producing a set of TRC's for a color printer's secondary halftone screens that is correlated with the printer's primary halftone screens. The method makes use of the printer/screen characteristic data that is normally gathered during screen calibration. However, instead of progressing from the data to a normal calibration for the secondary screens, the method goes backward through the data starting with the finished primary screen TRC's. The method insures that for every primary screen density, the closest possible secondary screen density is used when the same digital value is specified.

1 Claim, 3 Drawing Sheets

CORRELATED SECONDARY TRC CALIBRATION METHOD

CROSS-REFERENCE TO RELATED APPLICATIONS

This application is a divisional of U.S. application Ser. No. 09/569,637 filed May 12, 2000.

BACKGROUND AND SUMMARY

A method of avoiding artifacts when printing at the border between two different halftone screens by using a computation to match the two tone reproduction curves (TRC).

In a printer, and more particularly in a color printer, each color separation is calibrated by generating a TRC which determines how much toner will be applied for a given image data input, over the entire range of luminance. In this discussion, "luminance" is meant to cover density, Delta-e from paper, brightness or any other light measurement. A typical method of generating a TRC is to measure the luminance of a set of color patches produced by the target printer and toner. These are plotted against the actual number of ON pixels in the dot to create a smooth "primary screen characteristic". This curve is then normalized, transposed and rounded up or down to form the TRC, which is the same data, but converted into individual points of integer values for use in a halftone screen. For a numerical example, in a system where the screen values are 0 to 256, if a patch that appears to be 50% gray is required, the digital output value may be quite a bit higher or lower than the mathematical midpoint of 128 in order to put down exactly that amount of toner to appear to be 50% gray. In this case the number "128" would be the TRC input value, and a number somewhat different would be the output, to be used as the number of ON pixels in the screen. Several TRC curves are generated, one for each separation, usually black, cyan, magenta and yellow.

It is also typical in color printing to have halftone screens of varying frequencies, with the higher frequencies being used for graphics and text where accurate outlines are needed, and lower frequencies being used for color pictures where a greater variation of colors is needed. Halftone screens that vary in some characteristic other than frequency may also be used. In this discussion, frequency will be used as the example. In this case, a TRC for each frequency of each separation must be generated. Then, as the raster proceeds from one type of screen to another, the TRC's are switched from one set to another.

This system works well enough in an ordinary printer, but for quality color printing, and especially if trapping is used, an artifact may be produced at the border between screens of the same color but of different frequencies if the TRC's do not track together closely enough. For a numerical example, let us assume that the high frequency halftone is 8×8 pixels with image data values of 0 to 64 and the low frequency halftone is 16 by 16 with values from 0 to 256, so that there is a ratio of 1 to 4. Therefore a high frequency image density value of 10 should be the same color density as a low frequency image density value of 40. Further, the TRC's are not continuous lines but are actually a series of points that are defined as integers, to be used to in a halftone screen, and so there is an inevitable amount of rounding up or down for each value. If, for example, the point is rounded up in one TRC and down in the other, there will be a visual artifact in luminance as the screen is switched between them.

This artifact can be eliminated if the primary (low frequency) and secondary (high frequency) curves track as closely as possible. This can be accomplished by using each point on the primary screen TRC (rather than the secondary screen characteristic as in the prior art) as the starting point to generate the corresponding point on the secondary screen TRC. This results in better tracking between the two because, to oversimplify, if the primary value was calculated by rounding up (rather than rounding down), and the secondary value is a function of the primary, then the process will tend to result in a larger value for the secondary as well, and better agreement results.

Points on the secondary TRC are generated from a series of equivalent points of the primary. The specific process for generating one point on the secondary TRC from the corresponding point on the primary TRC can be explained as follows, assuming that the secondary screen is n times the frequency of the primary.

1. A point P2 on the primary TRC is selected.
2. A point P3 on the primary characteristic having the same output value as P2 is selected.
3. A point P4 on the secondary characteristic having the same luminance as P3 is selected.
4. A point P5 having $1/n^2$ the input value of P2 and the same output value as P4 is selected.
5. The point of the secondary TRC can now be determined by rounding the output value of P5 up or down to the nearest integer.

The two resultant TRC's will track more closely than they would have if formed independently since, in this case, the secondary value is a function of the rounding, up or down, of the primary.

DETAILED DESCRIPTION OF THE INVENTION

In a typical system, a primary lower-frequency and more stable halftone screen is used for pictorial information while a secondary higher-frequency screen is used for the edges of text, and also possibly for anti-aliasing and trapping.

Theoretically, independent calibrations of different halftone screens for a printer should end up producing the same ink density from each of the screens when the same digital value is specified. And, on the average, this is what happens. However, on a level by level scale, there is commonly enough difference in the calibrations that the human eye can sometimes see a transition from one screen to the other even when the same value is specified.

These differences are partly due to the printer not being repeatable from page to page or from side to side on the same page in the density it creates during calibration.

It is also partly due to noise in the densiometric or calorimetric measurements. A third source of error is the integer arithmetic that is used to create a TRC, there are only 256 possible values, and one screen may switch to the next level at a slightly different value than the other.

The two different halftone screens require frequent calibrations also because they may respond differently to drift of the xerographic set point. This drift could be in any or all the xerographic parameters such as voltages, screen end-points, d-MAX, tribo conditions, humidity, etc., that are normally controlled by internal feed-back circuits or max-setups. While the internal feed-back can return to a nominal performance for the primary screen, the new parameter settings might be less likely to return the secondary screens to their nominal condition as they are more sensitive and have less latitude.

Because the engine response is typically different for different line screens, and also because of considerable noise in measurements, independent calibrations of the two screens do not track together. This causes problems when the screen is switched for edges.

Instead, this correlated calibration method uses a normal calibration for the primary screen to get the primary TRCs, but then goes backwards through the measurement plots to achieve a set of TRCs for the secondary screen that produce the same density as the primary. The resulting secondary TRC is not as smooth as a normal calibration would produce, but the secondary screen is not normally used in a situation like a gradation or sweep where that would be a problem. As part of the correlated calibration, two adjacent sweeps with the two screens are printed out to ensure that it is difficult to see the transition between them.

Figure 1:
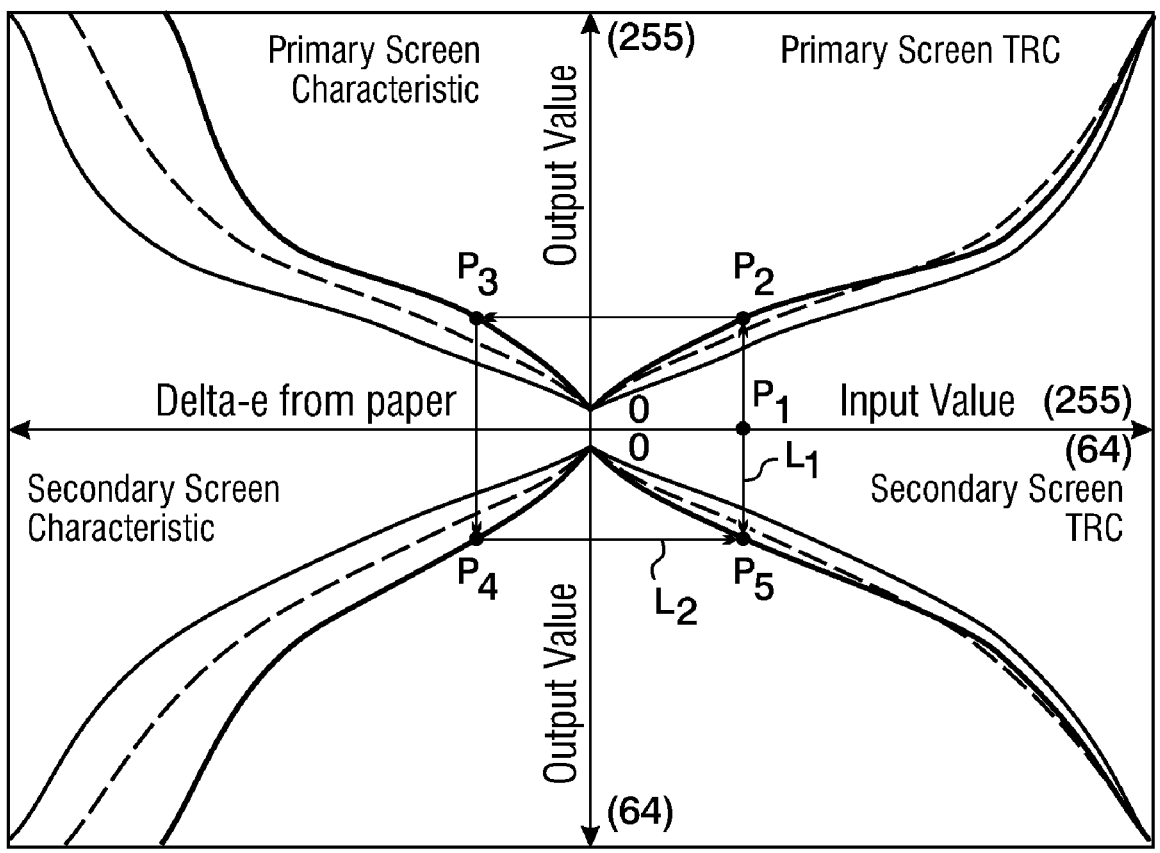
FIG. 1 is a graphical description of the relationships between the primary and secondary screen characteristics and TRC's.

FIG. 1 shows a Jones diagram that demonstrates the correlated TRC concept.

In the normal Primary calibration, color patches are printed and measured to produce the Primary Screen Characteristic data for cyan, magenta, yellow, and black that is shown in the upper left quadrant of the plot. It is shown here as Delta-e from paper, but it might also be Luminance or even density data. From this data, with appropriate normalization and other color information, the Primary Screen TRC's are produced, as shown in the upper right quadrant.

In prior art calibrations, this process is repeated independently for the secondary screens.

In this correlated TRC method, the Secondary Screen Characteristic data is first produced as before, now shown in the lower left quadrant of the figure. Then the new processing proceeds in a counter-clockwise fashion around the Jones diagram for each color and each input value point.

A typical calculation for a cyan point starts at point P1 in the diagram. This value is passed through the Primary Screen TRC to get the TRC value P2. The value P2 is then passed through the Primary Screen Characteristic data by means of linear interpolation or a spline-fit routine to produce the point P3. P3 is the Delta-e from paper that the input value P1 will produce.

Then point P3 is passed backwards through the Secondary Screen Characteristic data, again by linear interpolation or spline-fit, to produce point P4. Point P4 is the output value that produces the identical Delta-e for both screens. This point P4 is then associated with Point P1 as one point P5 in the new Secondary Screen TRC. In the normal course of events, P5 will not line up at an integer TRC value and will have to be rounded up or down to the nearest integer. The completed Secondary Screen TRC is shown in the lower right quadrant.

The same process is repeated for the remaining color screens.

The maximum vertical and horizontal axis values for the primary and secondary curves of the Jones diagram may frequently be different. In the FIG. 1 example they are 256 and 64 for primary and secondary screen TRC's, but a Jones diagram is routinely normalized so that both are the same vertically and horizontally on the graph. In this latter case, for example, the input values of P2 and P5 will be equal.

Figure 2:
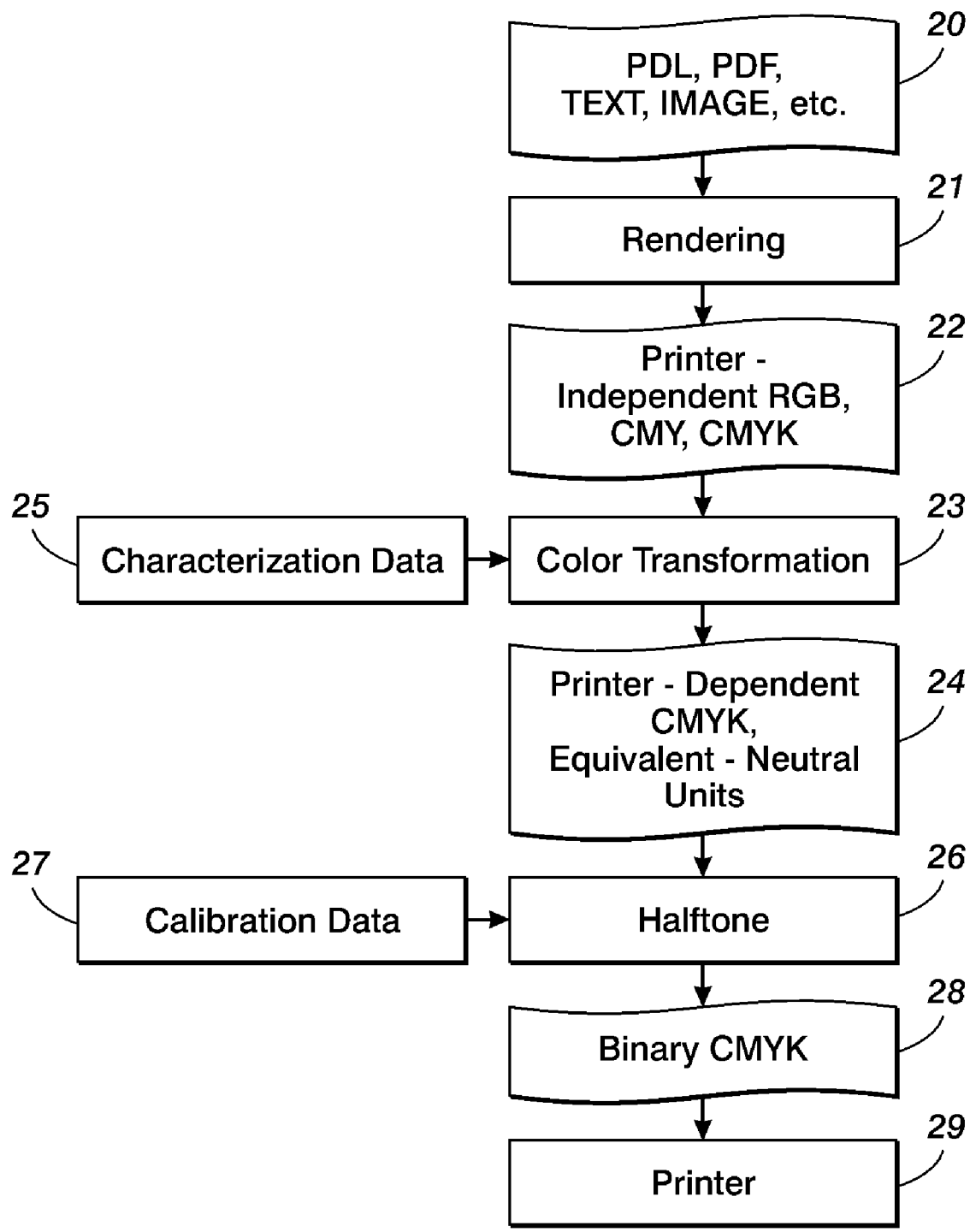
FIG. 2 is a flow chart showing the steps from page description language to printed page.

FIG. 2 is a flow chart of the entire prior art printing process, starting with a document 20 described in one of the page description languages, where text is character coded and scanned in pictures could be in the form of multiple bits per image pixel.

These are rendered into printer-independent full color bit map raster at step 21.

Step 23 converts the image to the color space of the particular printer, using three dimensional characterization data 25, which reflects the permanent or long term characteristics of the printer, to create document 24. This step includes color correction and undercolor removal.

Step 26 halftones the image pixels using calibration data 27 which is updated on a frequent basis to calibrate the TRC's, one for each color of each screen, to produce the final binary page 28, which is printed 29.

Figure 3:
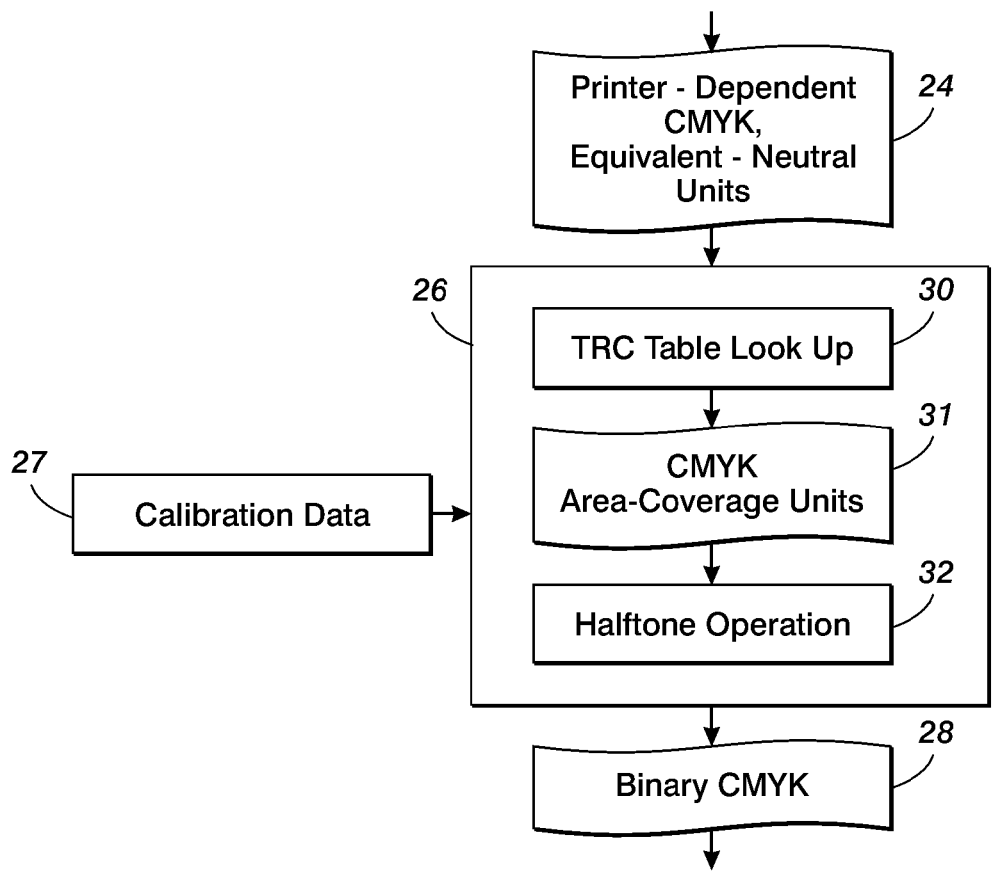
FIG. 3 shows the halftone step 26 of FIG. 2 in more detail.

FIG. 3 shows the halftone step 26 of FIG. 2 in more detail. The printer dependent image 24 is the idealized, neutral, version where, for example, a midpoint gray is specified as a mid point digital value, so in a system where the range is 0 to 256, 50% gray at this point would be described as a value of 128.

This data is modified by the TRC's at step 30 to produce an area—coverage version 31 which specifies how many ON pixels are to be requested, and this is the version that is used as the input to the halftone screening process 32 to produce the binary image raster 28. It is the generation of these tables, and subsequent modification of these tables as part of the periodic calibration, that is the subject of this invention.

Figure 4:
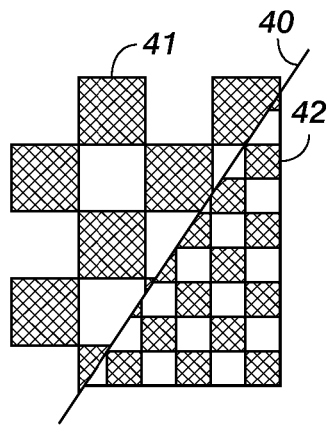
FIG. 4 is a diagram showing the situation in which the effect of this invention can be most clearly seen.

FIG. 4 is a diagram showing the situation in which the effect of this invention can be most clearly seen. An edge 40 runs between low 41 and high 42 frequency dots. The object is to make the densities as equal as possible on both sides of the edge. Using this invention, if the low frequency dots are the result of a rounding off to make the density darker, for example, then using the low frequency TRC value to generate the high frequency dots will tend to make them darker also, and therefore to more closely correlate the densities.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. In a printing system, a method for minimizing artifacts produced at a border produced by printing with a primary halftone screen on one side of the border and printing with a secondary halftone screen at the other side of the border, comprising:

provinding a document to be printed;

rendering the document into a full color bit raster;

converting the rendered document to the printing system's color space;

halftoning the converted document, wherein halftoning includes calibration of primary and secondary halftone screens for each color separation, comprising:

generating a first tone reproduction curve (TRC) associated with the primary halftone screen using input values from a selected color separation and primary halftone screen output characteristics, wherein each primary halftone screen output characteristic is a function of measured luminance (delta-e from paper);

generating a second TRC associated with the secondary halftone screen using the first TRC, the primary halftone screen characteristics and secondary halftone screen output characteristics, wherein each secondary halftone screen output characteristic is a function of measured luminance (delta-e from paper), comprising:

for each input value in the selected color separation, determining a first TRC output value and an effective primary halftone screen output characteristic value associated with the first TRC output value; and determining a secondary screen characteristic value having the same luminance as the effective primary halftone screen output characteristic value associated with the first TRC output value;

determining a second TRC output value based upon the secondary screen characteristic value having the same luminance as the effective primary halftone screen output characteristic value and the input value;

wherein generating the second TRC associated with the secondary halftone screen comprises:

producing a second point of a second TRC of the secondary screen from a first point of the first TRC of the primary screen, where the second screen frequency is n times the first;

finding a second point at the intersection of two lines, L1 and L2, where L1 is the input value of the first point divided by $n^2$, and L2 is the output value of a point on the secondary characteristic that has the same luminance as a point on the primary characteristic which has the same output value as the first point, and rounding the point to the nearest output value integer; and printing the halftoned document.

* * * * *